(12) United States Patent
Janabi

(10) Patent No.: US 10,060,120 B2
(45) Date of Patent: Aug. 28, 2018

(54) REPRODUCIBLE BUILDING STRUCTURE WITH INTEGRATED SOLAR ENERGY SYSTEM

(71) Applicant: Majid Janabi, Khalifa (AE)

(72) Inventor: Majid Janabi, Khalifa (AE)

( * ) Notice: Subject to any disclaimer, the term of this patent is extended or adjusted under 35 U.S.C. 154(b) by 0 days.

(21) Appl. No.: 15/131,023

(22) Filed: Apr. 17, 2016

(65) Prior Publication Data

US 2017/0298615 A1  Oct. 19, 2017

(51) Int. Cl.
| | | |
|---|---|---|
| *E04B 1/34* | (2006.01) |
| *E04B 1/24* | (2006.01) |
| *E06B 3/67* | (2006.01) |
| *E06B 9/68* | (2006.01) |
| *E04D 3/35* | (2006.01) |
| *E04C 2/54* | (2006.01) |
| *E06B 9/52* | (2006.01) |
| *E04F 13/08* | (2006.01) |
| *H02S 20/23* | (2014.01) |
| *E04B 2/96* | (2006.01) |
| *E04D 3/08* | (2006.01) |
| *E04B 1/343* | (2006.01) |
| *F24J 3/08* | (2006.01) |

(52) U.S. Cl.
CPC ........ *E04B 1/34384* (2013.01); *E04B 1/2403* (2013.01); *E04B 2/96* (2013.01); *E04C 2/54* (2013.01); *E04D 3/08* (2013.01); *E04D 3/352* (2013.01); *E04F 13/0889* (2013.01); *E06B 3/6715* (2013.01); *E06B 9/52* (2013.01); *E06B 9/68* (2013.01); *F24J 3/081* (2013.01); *H02S 20/23* (2014.12); *E04B 2001/249* (2013.01); *E04B 2001/2463* (2013.01); *E04B 2001/2466* (2013.01); *E04B 2001/2481* (2013.01); *E04B 2001/2484* (2013.01); *E04B 2001/34389* (2013.01)

(58) Field of Classification Search
CPC ...... E04B 1/34384; E04B 9/52; E04B 1/2403; E04B 2001/34389; E04B 2001/2466; E04C 2/53; H02S 20/23; E04F 13/0889; E06B 9/52; E06B 9/68; E06B 3/6715; E04D 3/352
See application file for complete search history.

(56) References Cited

U.S. PATENT DOCUMENTS

| | | | | |
|---|---|---|---|---|
| 2,593,891 | A * | 4/1952 | Kenney | ............ E04B 2/58 52/235 |
| RE26,430 | E * | 8/1968 | Beeler | ............ F24F 3/14 165/211 |
| 3,874,133 | A * | 4/1975 | Silvius | ............ F16B 12/125 403/311 |
| 9,089,212 | B2 * | 7/2015 | Chang | ............ A47B 47/0016 |

(Continued)

*Primary Examiner* — Jeanette E Chapman
(74) *Attorney, Agent, or Firm* — Mitchell Law PLLC; Matthew W. Mitchell

(57) ABSTRACT

Methods for constructing and a building kit for use thereof are disclosed. The building kit includes a plurality of posts configured for embedding within square apertures of a foundation, wherein the posts have a cross-shaped cross-sectional shape, a plurality of cross-shaped cross-sectional shaped elongated members, a plurality of roof panels, wherein the roof panels include solar cells, and a plurality of wall panels having conforming shape to the cross-shaped cross-sectional shaped elongated members.

8 Claims, 16 Drawing Sheets

(56) References Cited

U.S. PATENT DOCUMENTS

| | | | | |
|---|---|---|---|---|
| 2003/0145956 A1* | 8/2003 | Domel | ............ | E06B 9/68 |
| | | | | 160/168.1 R |
| 2007/0193143 A1* | 8/2007 | Antonic | ............ | E02D 27/02 |
| | | | | 52/241 |
| 2009/0020233 A1* | 1/2009 | Berman | ............ | E06B 9/32 |
| | | | | 160/5 |
| 2010/0134339 A1* | 6/2010 | Inoue | ............ | E06B 9/72 |
| | | | | 341/176 |
| 2010/0235206 A1* | 9/2010 | Miller | ............ | E04D 3/352 |
| | | | | 705/7.11 |
| 2013/0139468 A1* | 6/2013 | Poivet | ............ | F24J 2/4614 |
| | | | | 52/741.1 |

\* cited by examiner

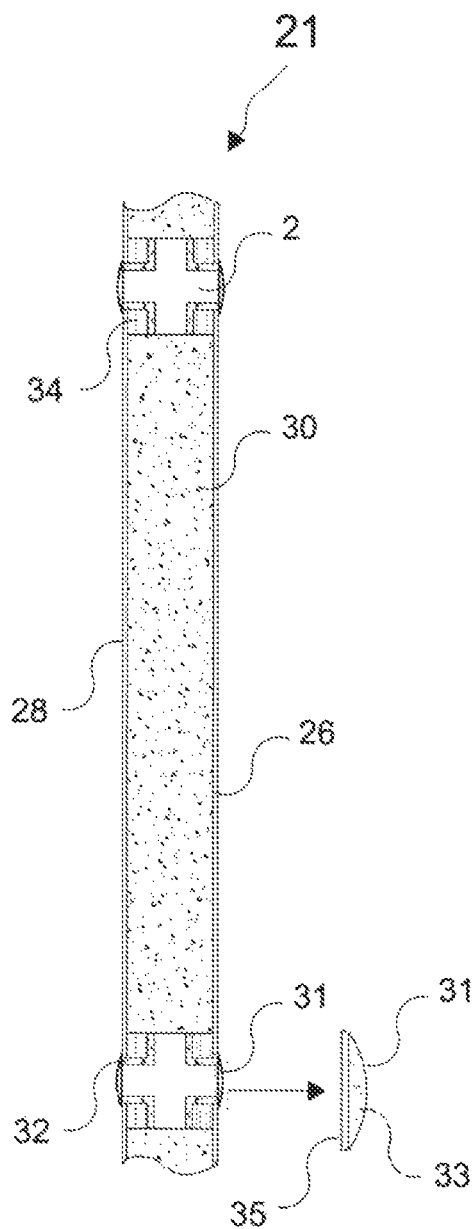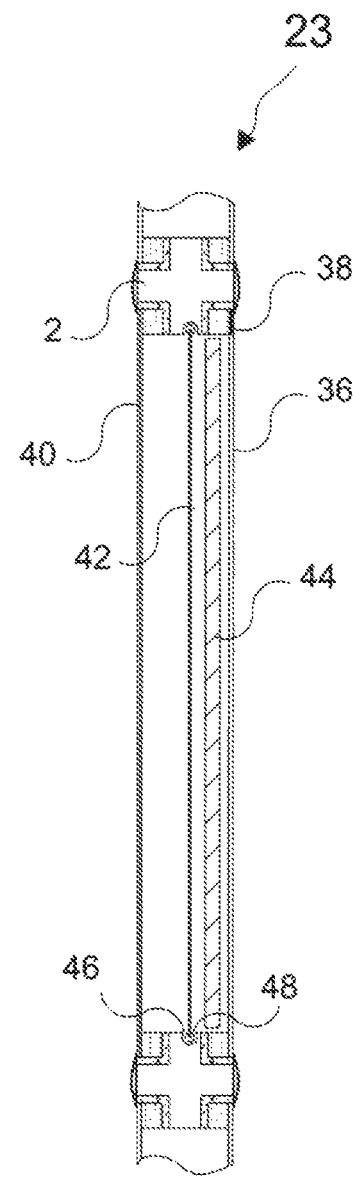
FIG. 4A   FIG. 4B   FIG. 5

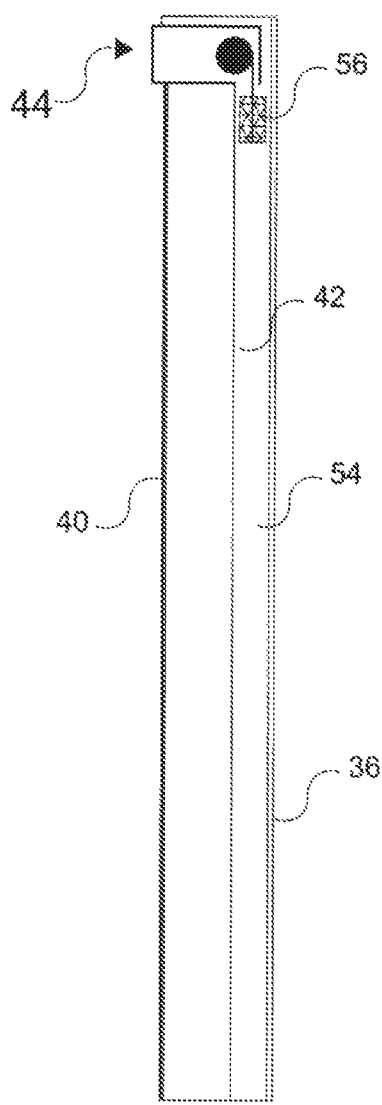 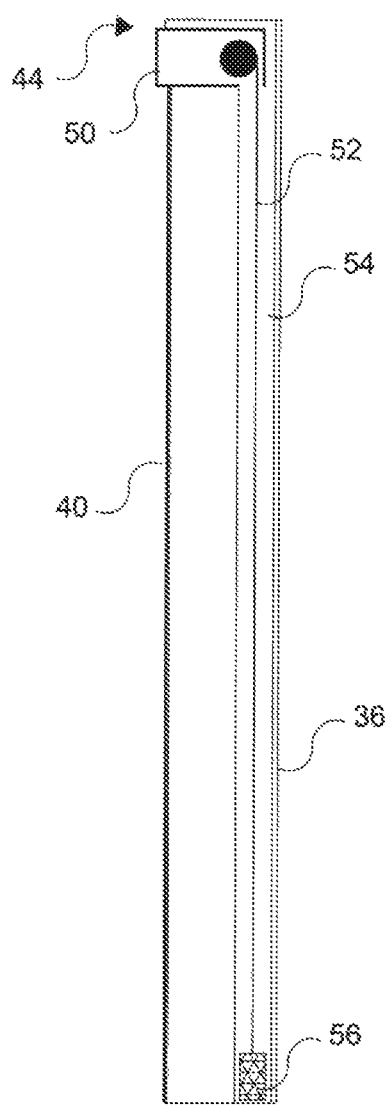
FIG. 6A Shade up
FIG. 6B Shade Down

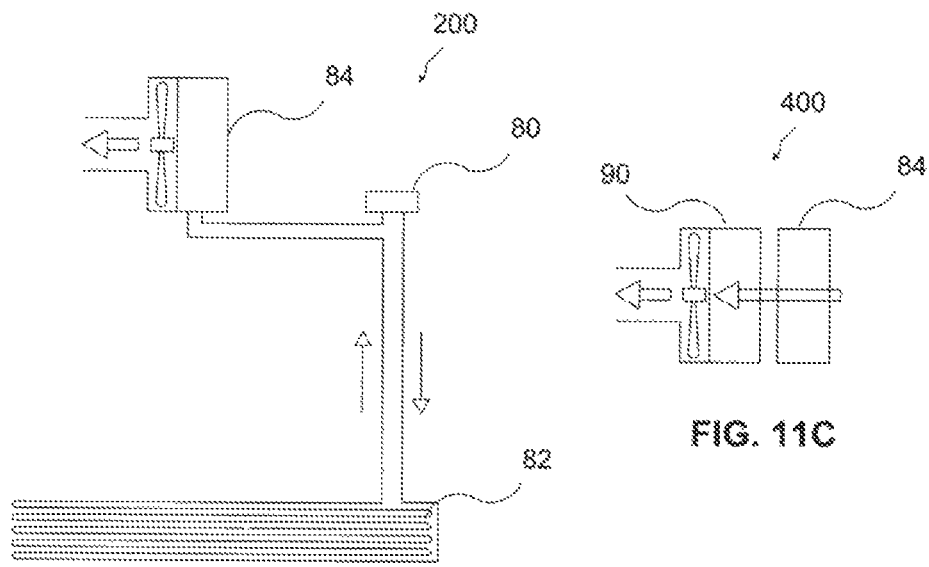
FIG. 11A
FIG. 11C
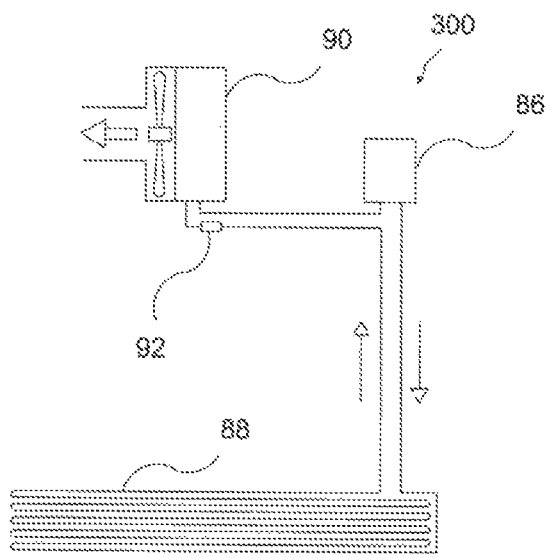
FIG. 11B

REPRODUCIBLE BUILDING STRUCTURE WITH INTEGRATED SOLAR ENERGY SYSTEM

TECHNICAL FIELD

This disclosure relates to building manufacturing and construction, and more particularly to building construction using pre-shaped and pre-sized components.

BACKGROUND

The statements in this section merely provide background information related to the present disclosure and may not constitute prior art.

Conventional building construction has many problems, including considerable on-site construction time and financial expense required to construct a structure, such as a multi-story home or commercial office building. Many construction projects are custom design requiring significant on-site labor, and so is subject to a variety of inefficiencies. New methods for construction are needed to alleviate inefficiencies with current construction techniques.

There are major challenges facing the world from dependence on fossil energy resources, which are only exacerbated by increasing population and the expansion of the urban areas. Therefore, future shortage of the fossil energy resources is expected. Another major challenge of the dependency on the fossil energy resources is the greenhouse effects on the environment, which has become scientifically evident with alarming signs. These major concerns have inspired the governments, universities, organizations, companies and concerned individuals to search for clean, renewable sources of energy. To date significant financial resources have been spent to develop reliable, clean, and renewable energy such as solar, wind, geothermal, and wave or tidal energy. Currently, there are no cost-effective solutions that are financially competitive with fossil energy sources, and so fossil energy resources remain the main energy supplier, providing approximately 92% of energy needed. Nevertheless, solar energy is the most successful, renewable, and widely used energy due its availability on earth.

The solar energy is the most abundant source of energy that can be captured and directed for human use. Although, there are many factors such as geography, time variation, cloud cover, and the space availability, that limit the amount of solar energy we can capture. Essentially, two types of solar energy projects are typically adopted; commercial, and private. The commercial projects are usually adopted by governments and companies, while the private projects are usually adopted by individuals to meet the energy needs of their own houses and businesses. The focus of this concept is on the private projects adopted by individuals. There are many basic factors that limit the individuals from using the solar energy, such as the cost of the panels and their installation, availability of the space, and negative ornamental effect on the building. Since many people have discovered that they can collect energy directly from their homes, roofs have become a common suitable site for placing solar cells. Nevertheless, the negative ornamental effect, and structural damage on the roof still remain as the undesirable consequences.

Therefore, it would be advantageous to offer construction methods and building kits to reduce or mitigate the known deficiencies and inefficiencies noted above including methods and kits that incorporate solar cells.

SUMMARY

Methods for constructing and a building kit for use thereof are disclosed. The building kit includes a plurality of posts configured for embedding within square apertures of a foundation, wherein the posts have a cross-shaped cross-sectional shape, a plurality of cross-shaped cross-sectional shaped elongated members, a plurality of roof panels, wherein the roof panels include solar cells, and a plurality of wall panels having conforming shape to the cross-shaped cross-sectional shaped elongated members.

Embodiments of the invention include geothermal air conditioning systems.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIG. 4A is a cross-sectional view of a wall having opaque glass from both sides and insulation material in between, in accordance with the present disclosure;

FIG. 4B is a cross-sectional view of a strip plate that used to fasten the glass to the posts, in accordance with the present disclosure;

FIG. 5 is a cross-sectional view of a wall having transparent glass from both sides and motorized shading system, in accordance with the present disclosure;

FIG. 6A is a vertical view of a wall having motorized shading system, showing curtain up, in accordance with the present disclosure;

FIG. 6B is a vertical view of a wall having motorized shading system, showing curtain down, in accordance with the present disclosure;

FIG. 11A is a diagram of passive geothermal air conditioning system using circulating fluid to exchange the heat between the building atmosphere and underground, in accordance with the present disclosure;

FIG. 11B is a diagram of regular geothermal air conditioning system using compressed gas to exchange the heat between the building atmosphere and underground, in accordance with the present disclosure;

FIG. 11C is a diagram of an integrated air conditioning system using both passive and regular geothermal air conditioning systems to save energy, in accordance with the present disclosure.

DETAILED DESCRIPTION

Figure 1A:
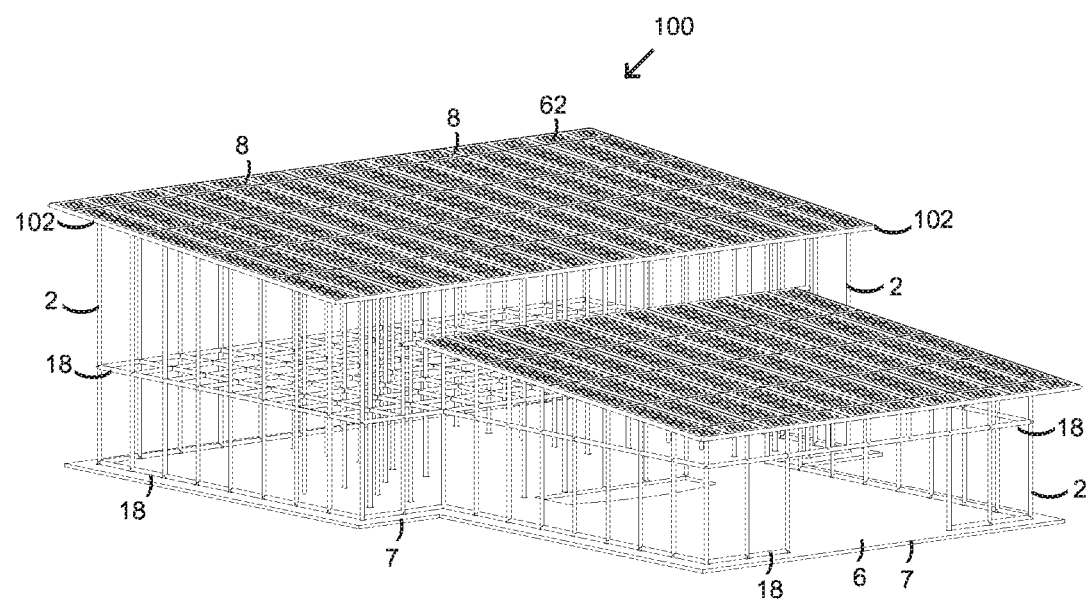
FIG. 1A shows an exemplary building, in accordance with the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in various embodiments" or "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based upon" is not exclusive and allows for being based on additional factors not described, unless the context clearly dictates otherwise. The word "exemplary" is used herein to mean "serving as an example, instance, or illustration." Any aspect described herein as "exemplary" is not necessarily to be construed as exclusive, preferred or advantageous over other aspects.

Referring now to the drawings, wherein the depictions are for the purpose of illustrating certain exemplary embodiments only and not for the purpose of limiting the same, FIG. 1A shows an exemplary building 100 formed of reproducible and standardized parts. As FIG. 1A shows, the building 100 includes a concrete foundation 6, a roof 102, which may include solar panels 62 in various embodiments, posts 2, horizontal supporters 18, and roof supporters 8. In various embodiments, the building 100 may be a steel structure but other materials may be used instead of, or in addition to, steel as known in the art. As will become apparent by a careful reading of the teachings herein, many configurations and arrangements of the building are possible using the parts as taught herein including, for example, various shaped buildings, buildings having one or more floors, buildings having various external facades, and buildings having desired quantity and placement of various windows and doors.

Figure 1B:
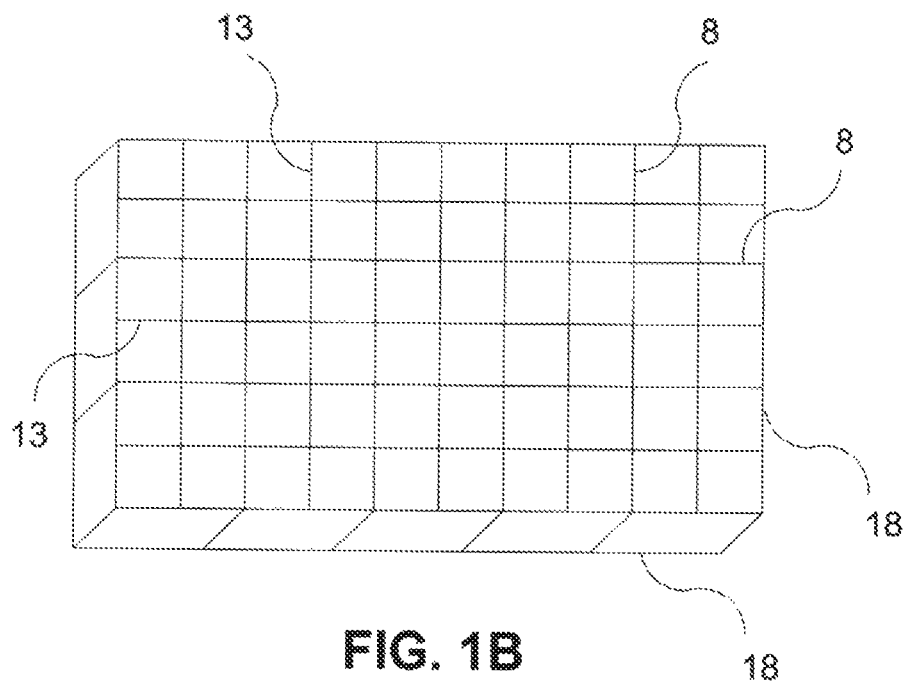
FIG. 1B is a perspective view schematically showing exemplary roof supporters, in accordance with the present disclosure.

The posts 2 are vertical elongated members joined by the horizontal supporters 18. In one embodiment, the posts 2 are erected into a ground or foundation such as the concrete foundation 6. The roof supporters 8 support the roof 102 and may, in some embodiments, be configured to receive solar panels 62. In some embodiment, each roof supporter 8 is positioned against one post 2, as shown in FIG. 1A, in this case, the distance between two supporters is equal to the distance between two posts. In another embodiment as shown in FIG. 1B, additional roof supporters 13 can be added as desired to support the roof. These additional roof supporters 13 may be positioned in between standard roof supporters 8, whereby the outer end can be fasted to the horizontal supporters 18. The horizontal supporters 18 are fastened perpendicularly to the posts 2. The posts 2, horizontal supporters 18, and roof supporters 8 may each have a cross-shaped cross-sectional shape as described herein below and shown in FIGS. 3A-3L.

In some embodiments, the roof 102 has roof supporters 18 (8) from two directions that intersect with each other to make a steel grid, which can add strength to the roof and host the solar panels 62. The length and the shape of the ends of the posts 2, horizontal supporters 18, and roof supporters 8 depend on their location in the building 100, as well as the structural and the architectural designs. In one embodiment, the structure frame of the building exclusively includes a plurality of posts 2, horizontal supporters 18 and roof supporters 8. Joint reinforcement pieces can be also added if desirable and should be fitted and hidden inside the hollows of the post 2, as well as the horizontal and roof supporters 18 and 8, respectively.

In various embodiments, it is preferred that a concrete foundation with a basement is included to provide stability and an underground heat sink, or heat pump consistent with the environmental weather known to occur in the geographical area. Furthermore, the basement would also provide storage and service rooms, as well as hub for air conditioning machines and ducts, pluming, and wiring. Although a concrete foundation without the basement is possible and inexpensive, yet not preferable in many embodiments.

Figure 1C:
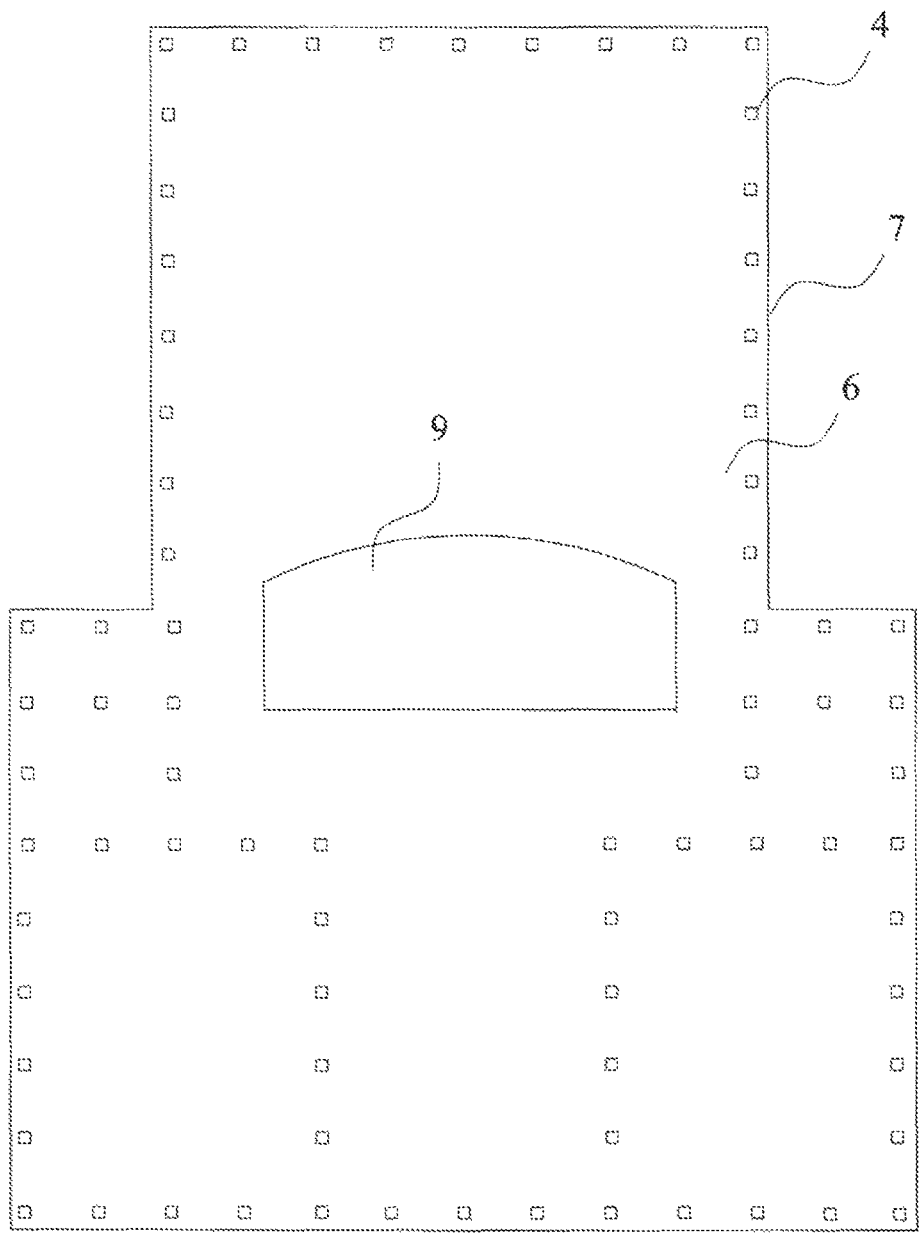
FIG. 1C is a view of concrete foundation of the building with plurality of square holes that fastened inside the concrete and distributed according to the building plan, in accordance with the present disclosure.

FIG. 1C schematically shows the concrete foundation 6 of the exemplary building 100. As FIG. 1C shows, a plurality of square holes 4 are embedded within the concrete foundation 6. In one embodiment, the concrete foundation 6 includes a border or perimeter 7 which can be made from steel or other material. The perimeter 7 may have a square cross-sectional shape, for example, but may be formed of other shapes as known in the art. If the building has a basement, an opening 9 in the concrete foundation 6 is added to provide an access to the basement. The distance between square holes 4, their distribution, and the depth of the square holes 4 inside the concrete foundation 6 depend on the architectural design and engineering requirements, but may be substantially equidistant and positioned at predefined intervals from one another. In one embodiment, a depth of the square holes is partial, i.e., the square hole does not pass through the concrete foundation 6. In various embodiments, it may be preferential to have an extra thickness of the concrete underneath the square holes 4 to support the weight of a heavier building.

Figure 2A:
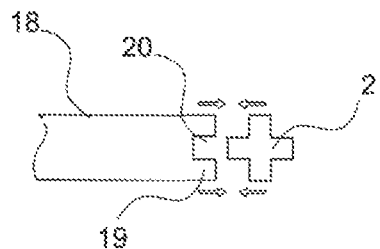
FIG. 2A is a cross-sectional view showing the techniques of joining a post to a horizontal supporter, in accordance with the present disclosure.
Figure 2B:
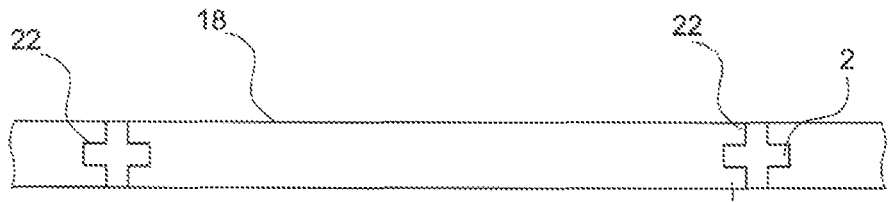
FIG. 2B is a cross-sectional view showing the techniques of joining two posts to a horizontal supporter, in accordance with the present disclosure.
Figure 2C:
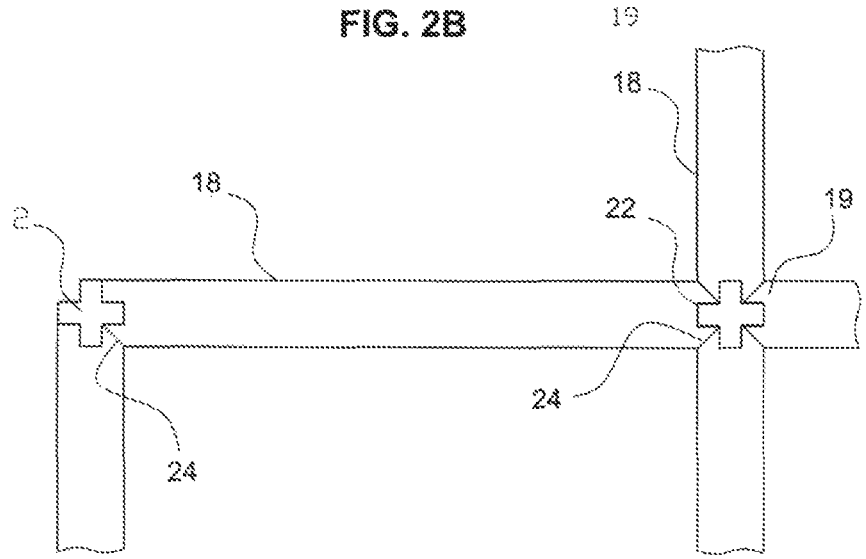
FIG. 2C is a cross-sectional view showing the techniques of joining a post to multiple horizontal supporters, in accordance with the present disclosure.
Figure 3A:
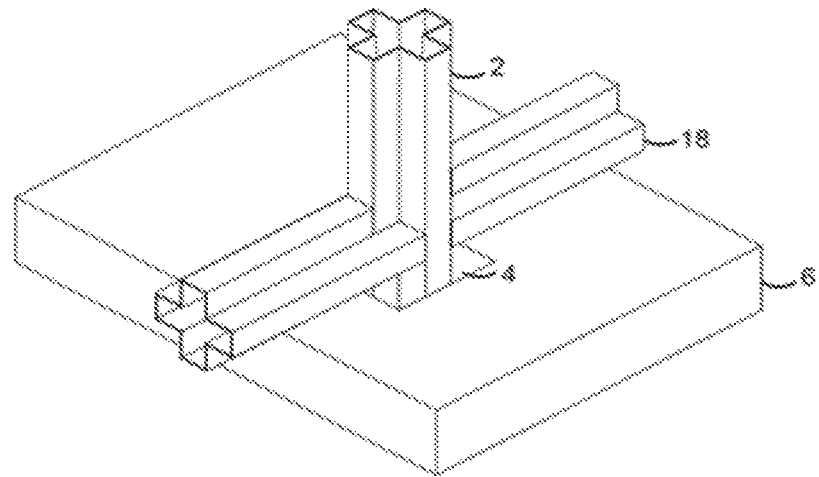
FIGS. 3A-L are perspective views showing selective techniques of the joints fabrication between the post, horizontal supporters and roof supporters, in accordance with the present disclosure.
Figure 3B:
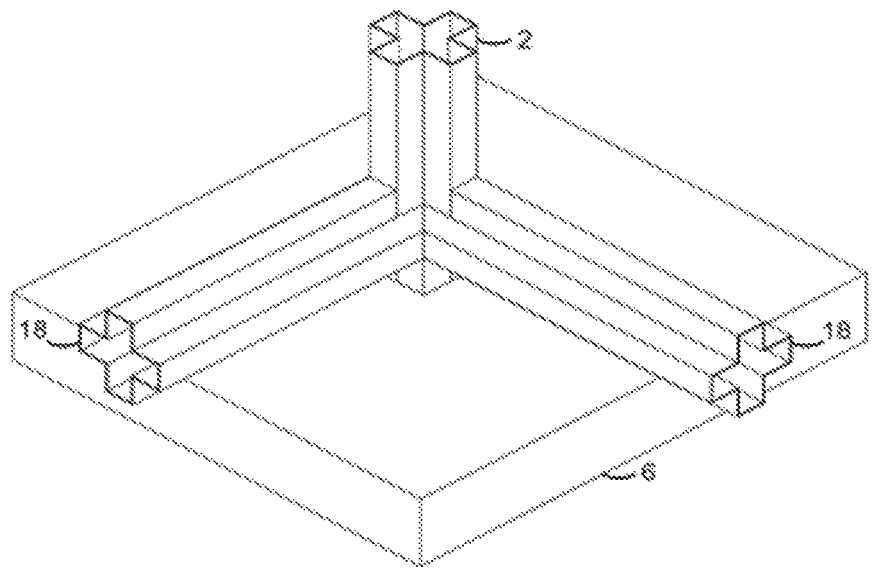
Figure 3C:
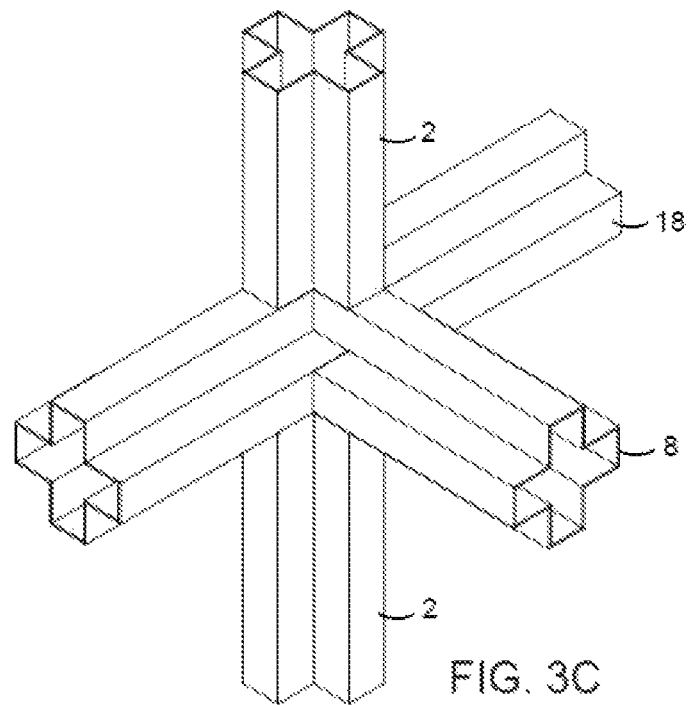
Figure 3D:
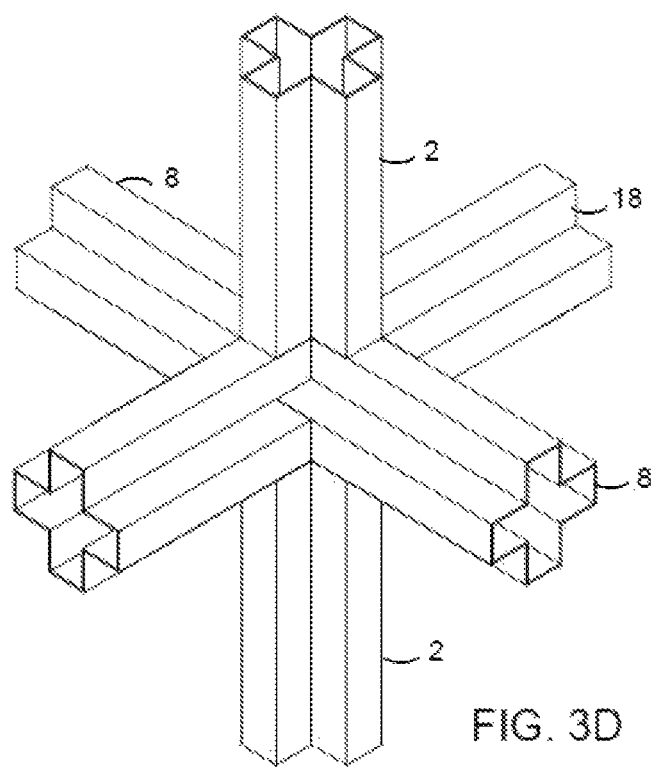
Figure 3E:
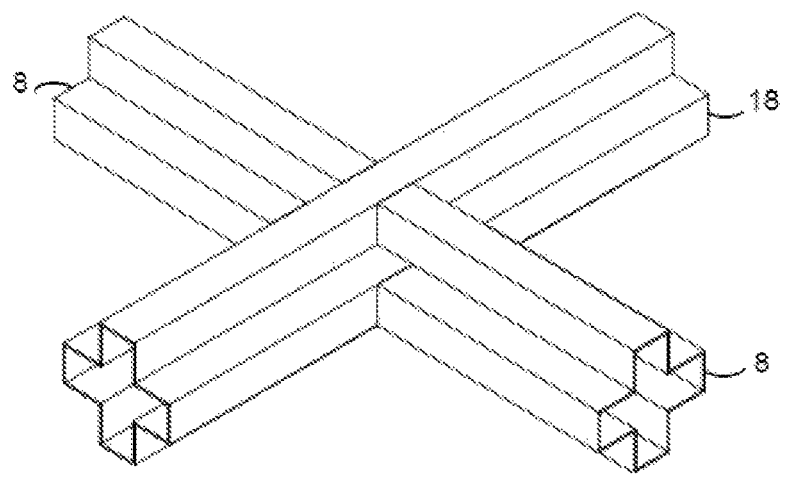
Figure 3F:
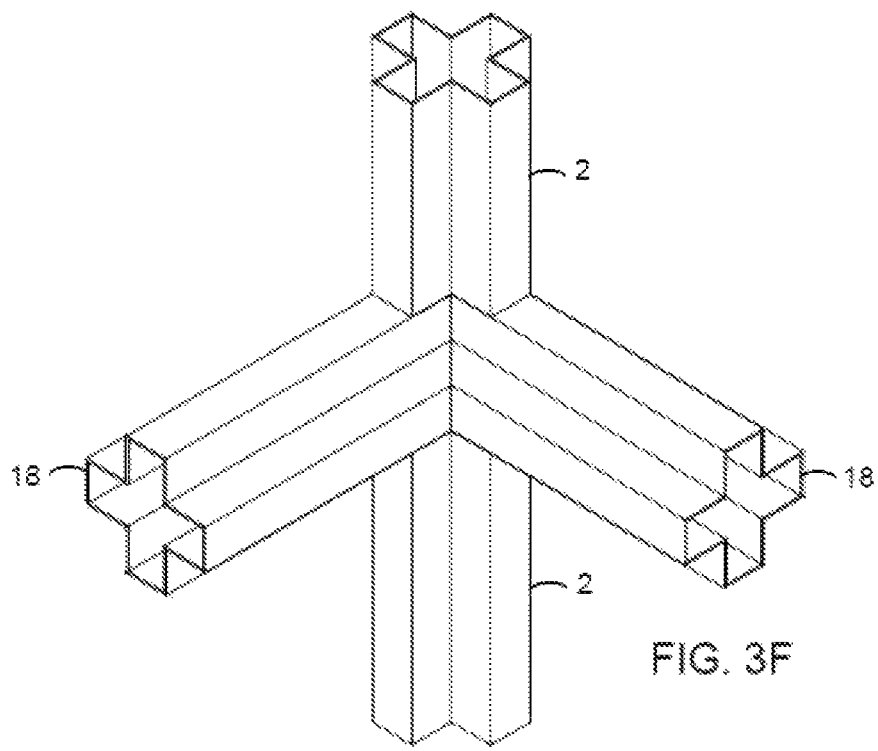
Figure 3G:
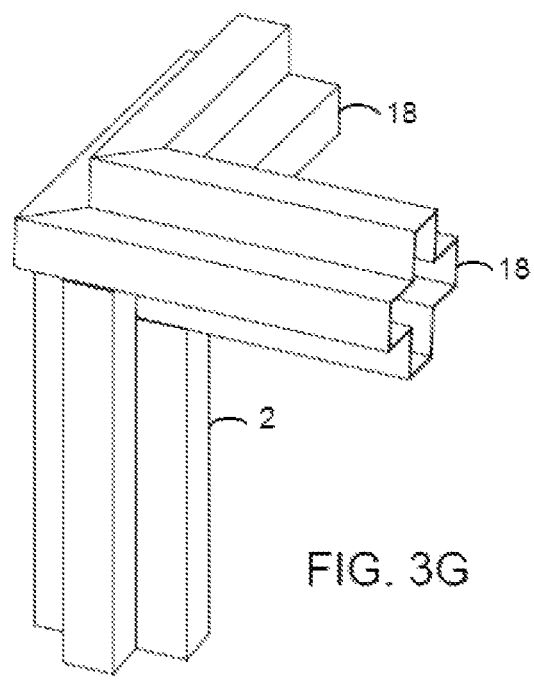
Figure 3H:
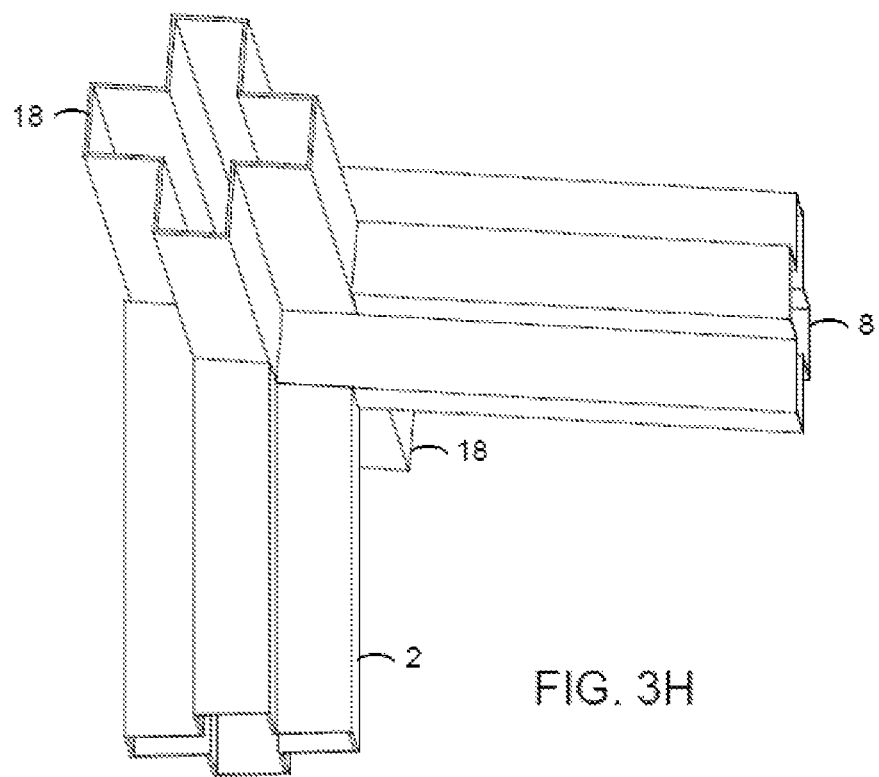
Figure 3I:
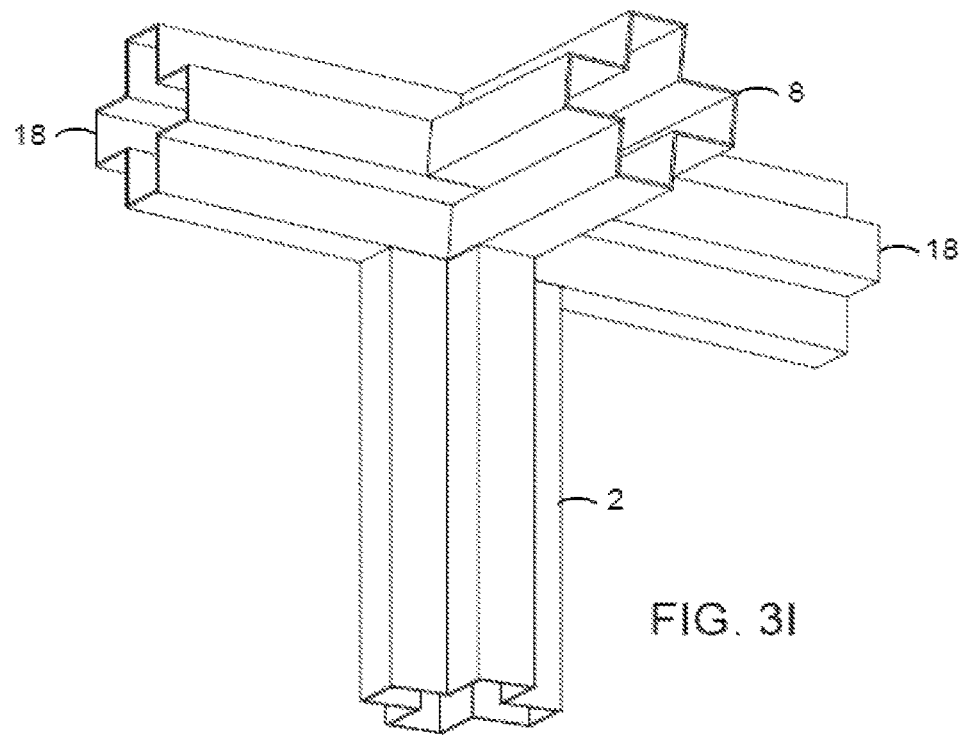
Figure 3J:
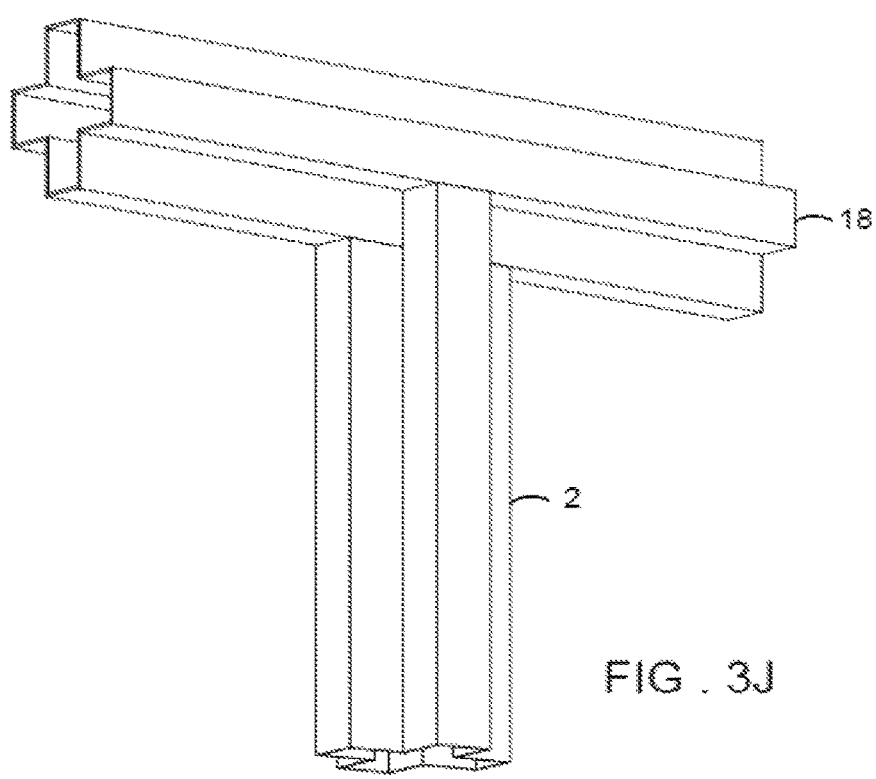
Figure 3K:
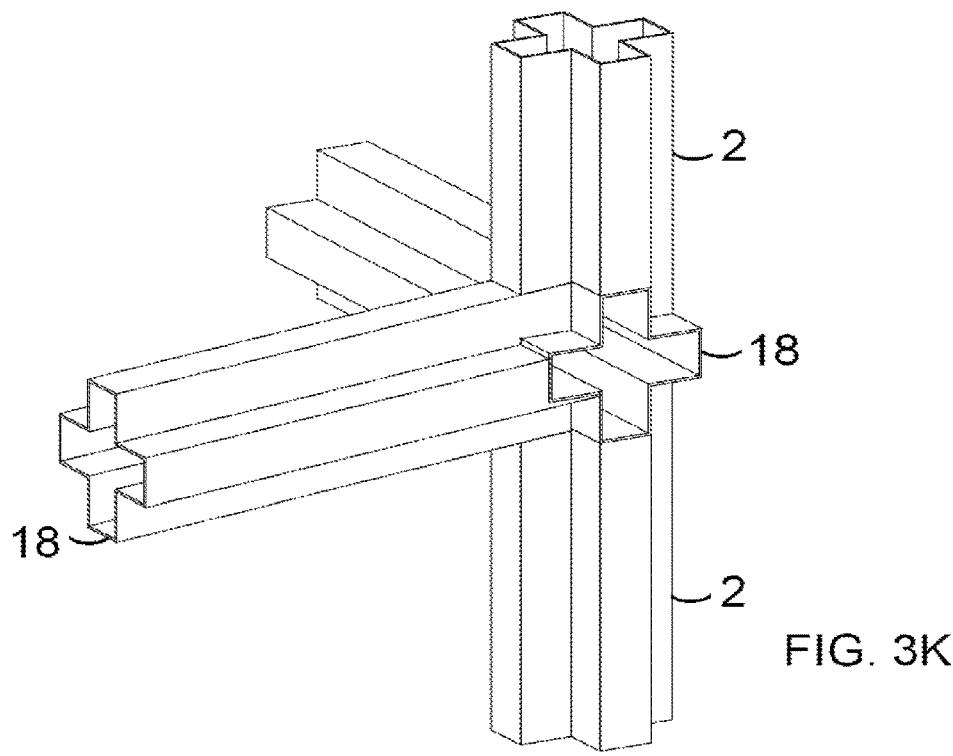
Figure 3L:
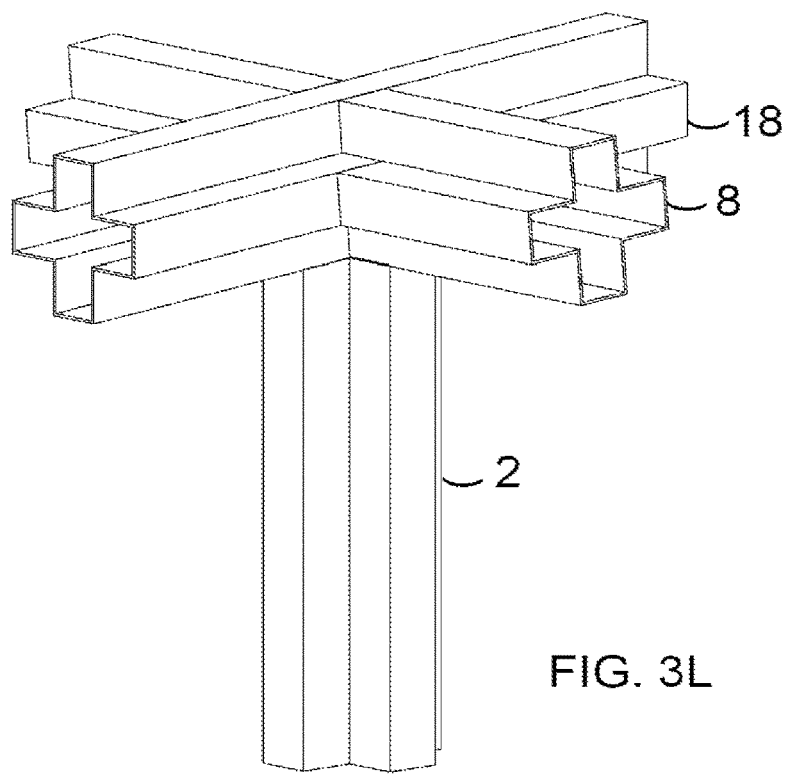

FIGS. 2A-C demonstrates one technique of joining a post 2 to a horizontal supporter 18, through a trough 20, which is cut into an end 19 of the horizontal supporter 18. The trough 20, and the post 2 are complementary to each other when joined together, and creating a joint line 22 that is preferably fastened by welding, but may be joined by other means as known in the art. When two or more horizontal supporters 18 join one post 2 at two directions, the ends 19 of the supporters 18 may be beveled 45-degrees, making a joint line 24, which is preferred to be fastened by welding or other techniques. The number of the groups of the horizontal supporters 18 that are fastened to the posts 2 in each floor depends on the architectural design, height of the glasses (glasses of the panels), as well as the location of the windows and doors, and other factors according to the engineering requirements. In many embodiments, however, typically two groups of horizontal supporters 18 are required; one at a lower end of the posts on the ground, and a second at an upper end of the posts at a roof, although it is contemplated that a single group would be appropriate for some embodiments.

FIGS. 3A-L are perspective views showing various joining techniques between the post 2, horizontal supporters 18 and roof supporters 8, in which ends 19 of the horizontal supports 18 are not required to be beveled. Before coupling, however, the posts 2, horizontal supports 18 and roof supporters 8 are preferably cut accordingly to fit and be complementary to each other. One of the main benefits of the teachings herein is efficient and relative ease of joining windows and materials sheets to a completed frame comprised of joined posts 2, roof supporters 8 and horizontal supports 18. In various embodiments it is essentially that the frame must not be disfigured or deformed during the joining techniques.

As FIGS. 3A-L show, there are multiple types of joints to be made using the post 2, roof supporters 8 and horizontal supports 18 which may be cut and modified accordingly to creating symmetrical frames and without deformity and free of welding or any extraneous debris to easily receive the wall panels, motorized shading system, windows, doors or solar panels. It is preferred that the roof supporters 8 when engaged to the posts 2 and horizontal supporters 18 must be entirely or partial above the post 2 or horizontal supports 18 to support the weight of the roof and reduce the stress on the welding to secure the roof and enable it to embrace more weight. The parts of joints may be fastened to each other by wielding or other techniques as known in the art.

The exterior walls panels of the building may be formed of two primary types. A first wall type includes two layers of opaque glass, one from external and one from internal, with thermal insulation there between. A second wall type includes three layers of transparent glass: an external layer, a middle layer, and an internal layer. In one embodiment, the second wall type further includes a motorized shading system. Those skilled in the art will readily recognize that many alternative materials may be used in place of glass including, e.g., fiberglass, vinyl, aluminum sheeting, and unplasticized polyvinyl chloride material (UPVC).

FIGS. 4A and 4B illustrates a cross-sectional view of an exemplary wall panel 21 with an external opaque glass 26, and an internal opaque glass 28, that fits between two posts 2. Between the external opaque glass 26, and the internal opaque glass 28 glasses there is a layer of thermal insulation 30. There is a thin thermal insulation layer 32 that separates the posts 2 from the external opaque glass 26 and the internal opaque glass 28. A cushion pad 34 fits between the glasses 26 and 28, and the thermal insulation 32 to provide support to the glasses 26 and 28.

FIG. 4B shows a slightly convex cross-sectional strip plate 31, having insulation 33, and a soft pad 35. The strip plate 31 can be formed of stainless steel or other solid materials. The strip plate 31 can be used to keep the glasses 26 and 28 in position as well as for decorative purposes in some embodiments. The strip plate 31 can be fastened to the posts 2 by means of screws or rivets or other mechanical fasteners. The insulation 33 is configured to keep the posts 2 insulated from outside ambient conditions, while the cushion 35 provides protection and flexibility between the strip plate 31 and the glasses 26 and 28. The cushion 35 also provides water proof seal against water leak to inside wall panels. It is preferably a 90-degree angle-shaped piece used in the corners instead of the strip plate 31. Although, as one skilled in the art can appreciate, the windows of the wall panels can be fixed to the post 2, horizontal supporters 18 and/or roof supporters 8 by many different mechanical techniques.

FIG. 5 shows a cross-sectional view of an exemplary exterior wall panel 23 of a building that includes a transparent glass 36, having an opaque border 38 to obscure a joint area. There are two additional transparent glass layers: an internal double-sheet 40 and a middle single sheet 42. The external glass 36 and the middle glass 42 create an insulation chamber that hosts a motorized shading system 44 in some embodiments. The glasses 36, 40 and 42 fit between two posts 2. The middle glass can be fastened by two small grooves 46 at sides of the posts 2 through a cushion pad 48. Alternatively, the middle glass can be fastened by other mechanical techniques.

FIGS. 6A and B are vertical views of the panel 23, showing the motorized shading system 44 that includes a motor and an electrical control unit 50, which selectively controls rolling of the curtain 52 up and down through a chamber 54. A weighted bar 56, which may be an elongated weighted bar, is fastened at a lower end of the curtain 52 to help in keeping the curtain 52 stretched and straight. It is preferred that the curtain 52 should be made from soft and flexible fabric material with good thermal insulation, but other materials may be used consistent with the teachings herein. FIGS. 6A and B show a vertical section of the motorized shading system 44 with curtain 52 down and up, respectively. The motorized shading system 44 fits between two posts 2; its motor and electrical control unit 50; and other parts are fastened to a board made from wood or other materials. The motorized shading system 44 fits above the internal double-sheet 40 and the middle single sheet 42 and complementary to them, thus causing a length of these two sheets 40 and 42 to be shorter than the external glass 36. In one embodiment, the motorized shading system 44 has a default set up, which has the curtain 52 drop by the weight of metal bar 56 in case of shortage of power supply in emergency situation. In one embodiment, the motorized shading system 44 is within walls having three isolated champers of air to provide thermal insulation for the building. A first chamber is between the external glass 36 and the middle glass 42. A second chamber is between the middle glass 42 and the internal glass 40. A third chamber is between the double layers of the internal glass, 40. A fourth chamber of air is possible by making the external glass, 36 double layers. The percentage of the exterior walls with motorized shading system as compared to the exterior walls with opaque glass and thermal insulation in a particular building depends on the personal preference, architectural design, and the weather. The percentage is preferably to be small in the regions with extreme cold and hot weather, while can be increased in the region with mild weather.

Figures 7, 8:
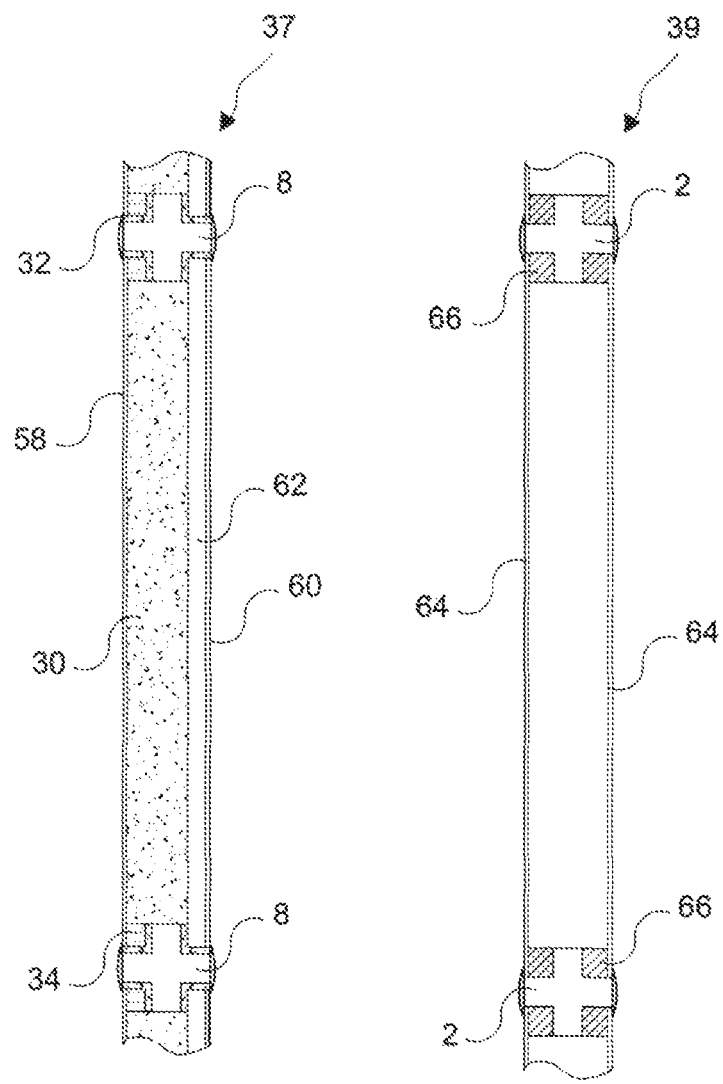
FIG. 7 is a cross-sectional view of a portion of the roof having a solar panel that is covered by an external transparent glass, in addition to insulation material that is maintained between the solar panel and internal layer, in accordance with the present disclosure.
FIG. 8 is a cross-sectional view of an interior wall having opaque glass from both sides and gap of air in between, in accordance with the present disclosure.

FIG. 7 illustrates a cross-sectional view of a roof panel 37 with an external transparent glass 60 that fits between two roof supporters 8. A layer of internal glass or other material 58 may also fit between two roof supporters 8. The internal layer 58, e.g., an internal planar member, is isolated from the roof supporters 8 through a layer of thermal insulation 32, and a cushion pad 34. A solar panel 62 may be positioned on the roof supporters 8, and is covered from the outside by an external glass layer 60. In various embodiments having a roof constructed without an external glass layer 60, the solar panels may be covered and/or laminated by glass by the manufacturing supplier. The size of the solar panel 62 may be based upon a distance between the roof supporters 8, architectural designs, and engineering requirements. There is a layer of thermal insulation 30 that presents between the solar panel 62 and the internal layer 58. The solar panels are also can be removed from the roof and replaced with insulation material without disturbing the integrity of the roof structure.

Wires of the solar panels 62 could pass through the insulation space and internal layer 58 to under the roof, and retained in the space between a ceiling and a false ceiling within the building 100. The main cables then pass through a dedicated passage to the control devices that can be placed in a storage room.

FIG. 8 shows a cross-sectional view of an exemplary interior wall panel 39 that includes two posts 2, two layers of opaque glass 64, which fit between the two posts 2. A cushion pad 66 is added to provide cushioning for the glass 64. Adding thermal insulation between the two layers of glass 64 is optional.

Figures 9, 10:
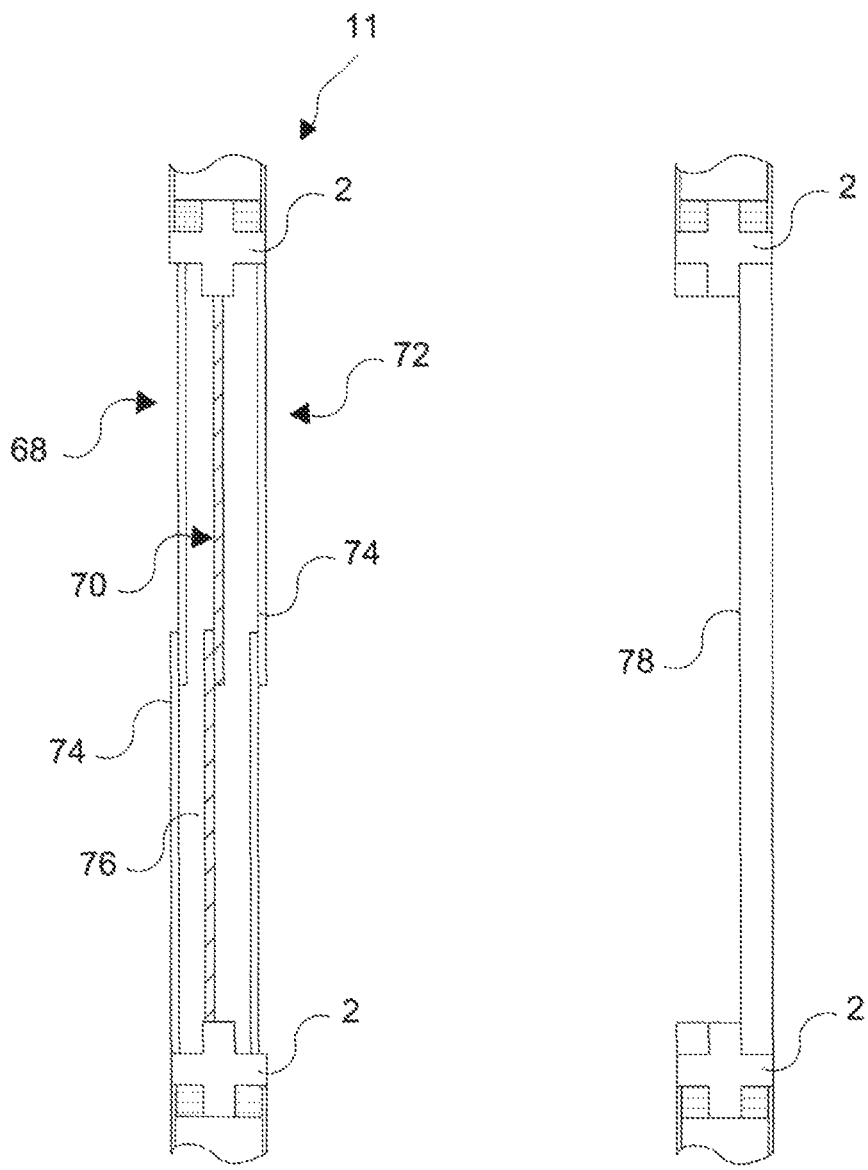
FIG. 9 is a cross-sectional view of window fastened between two posts and having three compartments of air and sheets of glass to reduce the energy leak, in accordance with the present disclosure.
FIG. 10 is a cross-sectional view of a door fitted between two posts, in accordance with the present disclosure.

FIG. 9 shows a cross-sectional view of a window 11 fastened between two posts 2. The window may be fastened between two horizontal supporters 18, one above and one below. The window 11 may be formed of three units: an internal unit 68, a middle unit 70, and an external unit 72. The internal and external units 68 and 72, each may include two sliding sash 74, preferably made from vinyl or other materials, and a double layer of opaque glass. The middle unit 70 may include two standard sliding mesh screen panels 76. This exemplary window 11 has one compartment and two thin layers of air to maintain good thermal insulation. The compartment of air is reserved between the internal 68 and the external 72 units; and the two layers of air are reserved between the glass layers of the external and internal units. The glass of the windows 11 is preferred to be opaque, as these windows are designed for ventilation only, whereas the day light enters the rooms of the building through the motorized shading walls. These windows 11 do not required blind or curtains since they have opaque glasses. The sheets of the sashes could also be made from material other than glass that has good thermal insulation to reduce the thermal leak.

FIG. 10 shows a cross-sectional view of a door, 78, that is fitted between two posts 2 and a horizontal supporter 18 from above. Interior and exterior doors can be designed and fit between any two posts 2, and bordered from above by a horizontal supporter 18. In one embodiment, if the distance between two posts is too wide or the height of the horizontal supporters is too high for the door. Then a door frame can be made from two additional posts and one horizontal supporter, to be positioned between two standard posts. Decorative materials can be used to cover the posts and horizontal supporter as desirable. The material, style, and size of the doors are not specific, and can be made from wood, glass, or other materials. Doors can be styled according to the architectural design, and sized according to the reproduction and assembly standards. As one skilled in the art can appreciate, the flooring may be one or more known types including conventional from wood, tile, and carpet. The air conditioning ducts, pluming tubes and wires can be passed from floor to floor using dedicated passage, and using the false ceiling to pass from room to room.

FIG. 11A is a diagram of the geothermal air conditioning system 200 that operates by circulating fluid. It includes a water pump 80, a heat sink coil 82, and a heat exchanger 84. In regions with hot weather, the water pump 80 circulates a fluid between the heat sink coil 82 and the heat exchanger 84 where the fluid loses some of its heat, and returns colder than the room temperature, then circulates through the heat exchanger 84 to cool the building. In cold weather regions, the system is used to warm the room temperature. Depending on the nature of the ground, the heat sink coil 82 is placed underground either in horizontal position for 2-6 meters or vertical position for 50-100 meters. In various embodiments, the air conditioning system 200 can be used as a sole air conditioning system in regions with mild weather or as a supplemental system in the geographical regions with extreme or volatile weather.

FIG. 11B shows an embodiment of the geothermal air conditioning 300 which uses a refrigerating gas instead of circulating fluid. It includes gas compressor 86 that compresses the refrigerating fluid to the condenser coil 88 to lose the heat and return to the evaporator 90 through a thermal expansion valve 92. The condenser coil 88 as in the preceding system is placed underground either vertically or horizontally. This system 300 has more capacity for air conditioning, however, it consumes more energy compared to the previous fluid-based system. To save energy, it is possible to integrate both fluid and gas air conditioning systems which increases the air conditioning capacity and decreases the operating power. As depicted in exemplary FIG. 11C, the heat exchanger 84 of the circulating fluid-based system and the evaporator part 90 of the refrigerating gas-based system can be manufactured as one unit with one fan to form the integrated system 400. The integrated system 400 is controlled by an electric and thermostat circuits that operate the system according to the desired setting. In energy saving mode, the circulating fluid system is the primary air conditioning system. When this system is not able to air condition the indoor climate to the desired temperature, the integrated system (400) switches automatically to the refrigerating gas-based system. The energy saving mode setting is preferred to be used in regions with mild weather, when the building is empty, and as an assistant system to the refrigerating gas-based system. In the last option, the circulating fluid system starts to work first to air condition the space. When it reaches its maximum capacity without reaching the desired indoor temperature, the water pump 80 stops, and the gas compressor starts to takeover to attain the desired temperature.

Figure 12:
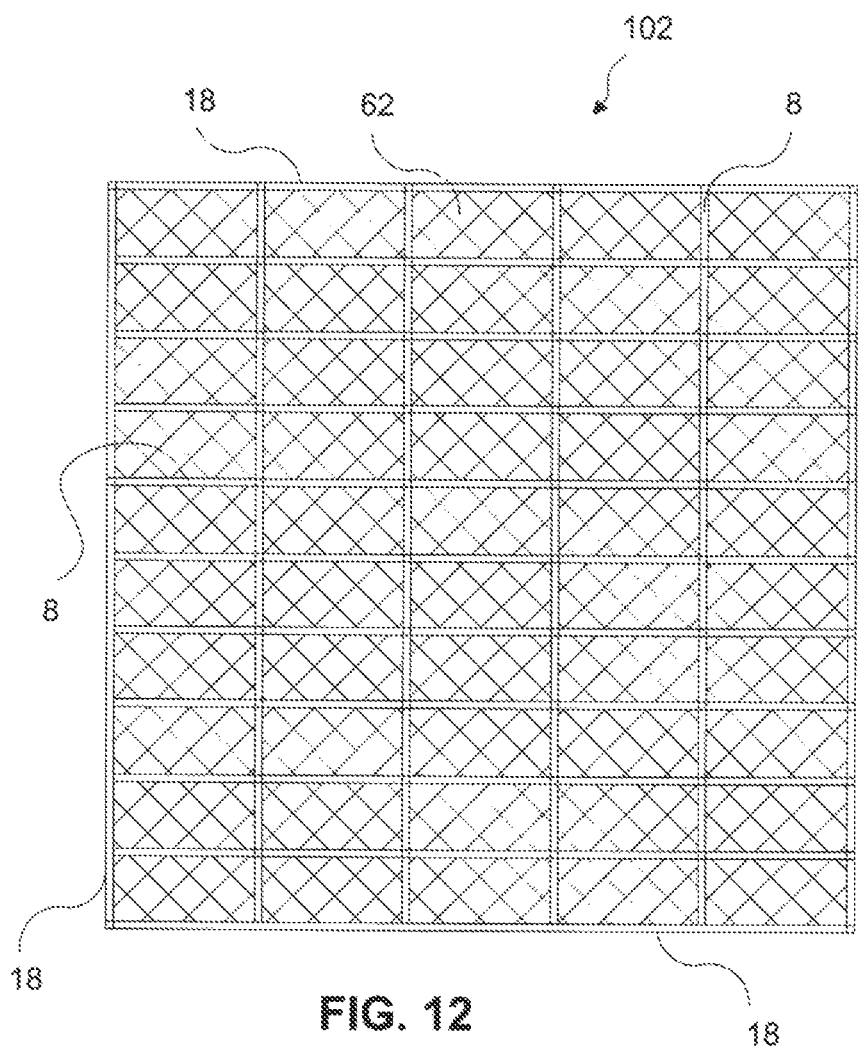
FIG. 12 is an aerial view of roof showing solar panels that are fastened to the framing grid of the roof, in accordance with the present disclosure.

FIG. 12 shows an exemplary roof 102 of a building with solar panels 62, which may be integrated in the roof 102 without additional framing and support system. In various embodiments, each solar panel that is located at corner of the roof is hosted by two horizontal supporters 18 and two roof supporters 8. The solar panels 62 that located at the remaining of the border of the roof are hosted by one horizontal supporter and three of roof supporters. While those that are located internally, i.e. away from the roof's border is hosted by four roof supporters). As the panels 62 are implanted inside the roof; there is a possibility to convert the entire roof 102 into a solar energy collecting system without negative ornamental effect on the building. The roof 102 can be extended beyond one or more of the walls to increase an area that host solar panels to collect more energy. It is also possible in some embodiments, to install solar panels in the walls of the building that facing the sun shine to increase the amount of the collected solar energy. The method of instillation is similar to the method that used for the roof. It is estimated that each square meter of the solar panel collects 150-200 watts. If the size of the roof is 100 square meters, approximately 90% of the size can be used for collecting solar energy, while the remaining 10% is lost due to the steel roofing supports. When 150-200 watts multiply by 90 square meter, we get 13.5-18.0 KW of energy for every sun-shine hour. In most cases this energy suffices or exceeds the requirement of a small building. There are two options to deal with extra energy that is collected from the solar system during a sunny day. It can either be sold to the national power grid, or stored for night air conditioning if option one is not available. One practical technique to use the electrical energy for night air conditioning is to convert it to storable form of energy. For example, a large quantity of water can be cooled or iced using the surplus electricity during the day, and stored in an insulated container for night air conditioning by using a heat exchanger system. The space between the false ceiling and the ceiling can be used as a hub for the solar system wiring. The cables then pass through a dedicated passage to the basement to control devices.

A provisional source of energy can be obtained from the solar panels 62 after adding a loop of tube attached to the back to solar panels. The tubes of all panels connect in serial or parallel with each other to make single or multiple pathways. A circulating fluid can be pumped into the tubes to absorb the heat that is generated from infrared sun waves, and trapped in the glass chamber that host the solar panels. This heat can be used for water heating for domestic uses in cold weather regions. In the hot weather geographical regions, the solar panels 62 can heat the water or another circulating fluid up to 70° which can be used to generate electricity. Although, a cost effective technique to harvest useful energy from such low-to-moderate temperature source to generate electricity are not currently available, in the near future this kind of technology, likely will become achievable as extensive research is currently being conducted by governmental agencies, universities, and private companies to develop such a technology. A further advantage of collecting the heat from the roof 102 is to improve the efficiency of the solar cells, as the high temperature has negative impact on their efficiency.

In various embodiments, this reproducible building system provides inexpensive, thermally insulated, and fast-to-build solar building. The reproducibility is most effective when the dimensions of the posts, horizontal supporters and roof supporters are standardized. The size of the glass, solar panels, doors, and windows can also be standardized in order to reproduce the building without delay or extra cost for custom made components. Though, the reproducibility does not require reproducing exact building size or architectural design. Buildings with different architectural designs and sizes can be reproduce using three techniques of reproducibility, fully standardized, partially standardized and non-standardized techniques. The fully standardized reproducibility can be achieved for different size and architectural design buildings, as long as rooms are designed and sized according to the available parts. The partially standardized reproducibility can be achieved for building with different designs and rooms sizes by using standardized and non-standardized (the dimensions of the metal bars and size of the glasses cut according to the need) parts. The non-standardized technique required that the metal bars and glasses are cut according to customized dimensions.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. Building kit for erecting buildings comprising:
a plurality of posts configured for embedding within square apertures of a foundation, wherein the posts have a cross-shaped cross-sectional shape;
a plurality of cross-shaped cross-sectional shaped elongated members, each having symmetry across at least four planes;
a plurality of roof panels, wherein the roof panels include solar cells; and
a plurality of wall panels having conforming shape to the cross-shaped cross-sectional shaped elongated members, wherein the wall panels each comprise:
an L-shaped layer of resilient material configured to conform to a surface of the post at a first corner and a second corner,
a first square cross-sectional shaped cushion pad placed between the L-shaped layer of resilient material and an exterior opaque glass portion proximate to the first corner,
a second square cross-sectional shaped cushion pad placed between the L-shaped layer of resilient material and an interior opaque glass portion proximate to the second corner, and
a layer of thermal insulation between the exterior opaque glass portion and the interior glass portion.

2. The building kit of claim 1, wherein the resilient material is thermal insulation material.

3. The building kit of claim 2, wherein the wall panel includes an exterior glass window and an interior glass window, wherein the exterior glass window is connected to a first sliding sash, and wherein the interior glass window is connected to a second sliding sash, wherein the exterior glass window is positioned within the first corner and the interior glass window is positioned within the second corner.

4. The building kit of claim 3, further comprising:
a plurality of cross-sectional strip plates configured to cover an outer surface of the posts and edges of a forward most surface of at least two wall panels.

5. The building kit of claim 2, wherein the wall panel includes an exterior and an interior glass window defining an interior chamber having a controllable electric-motorized shading device.

6. The building kit of claim 5, wherein the controllable electric-motorized shading device comprises a rollable curtain, an elongated weighted bar, a motor, and a controller device configured for remote actuation.

7. The building kit of claim 1, wherein the roof comprises a plurality of roof panels having a solar panel, a thermal insulation layer, and an internal planar member separated from the plurality of cross-shaped cross-sectional shaped elongated members by resilient material.

8. Building kit for erecting buildings comprising:
- a plurality of posts configured for embedding within square apertures of a foundation, wherein the posts have a cross-shaped cross-sectional shape;
- a plurality of cross-shaped cross-sectional shaped elongated members;
- a plurality of roof panels, wherein the roof panels include solar cells;
- a plurality of wall panels having conforming shape to the cross-shaped cross-sectional shaped elongated members, wherein the wall panels each comprise a layer of resilient material configured to conform to a surface of the post and wherein at least one surface of the wall panel is formed of an opaque glass material; and
- a first plurality of convex cross-sectional strip plates configured to cover an outer surface of the posts and edges of a forward most surface of at least two wall panels;
- a second plurality of a convex cross-sectional strip plates configured to cover an outer surface of the plurality of cross-shaped cross-sectional shaped elongated members and edges of the solar panels; and
- one or more doors, wherein each door is configured to fit between two posts and one of the plurality of cross-shaped cross-sectional shaped elongated members, the doors being one-third of the width of the plurality of cross-shaped cross-sectional shaped elongated members.

* * * * *